United States Patent
Baker

(10) Patent No.: US 7,031,915 B2
(45) Date of Patent: Apr. 18, 2006

(54) ASSISTED SPEECH RECOGNITION BY DUAL SEARCH ACCELERATION TECHNIQUE

(75) Inventor: James K. Baker, Maitland, FL (US)

(73) Assignee: Aurilab LLC, Miatland, FL (US)

( * ) Notice: Subject to any disclaimer, the term of this patent is extended or adjusted under 35 U.S.C. 154(b) by 336 days.

(21) Appl. No.: 10/348,966

(22) Filed: Jan. 23, 2003

(65) Prior Publication Data

US 2004/0148164 A1 Jul. 29, 2004

(51) Int. Cl.
*G10L 15/00* (2006.01)
*G10L 15/12* (2006.01)
*G10L 15/28* (2006.01)

(52) U.S. Cl. .................. 704/231; 704/236; 704/255

(58) Field of Classification Search ............ 704/231, 704/236, 239, 242, 251, 252, 255, 9
See application file for complete search history.

(56) References Cited

U.S. PATENT DOCUMENTS

| | | | |
|---|---|---|---|
| 4,748,670 A | 5/1988 | Bahl et al. | |
| 4,783,803 A | 11/1988 | Baker et al. | |
| 4,803,729 A | 2/1989 | Baker | |
| 4,866,778 A | 9/1989 | Baker | |
| 5,027,406 A | 6/1991 | Roberts et al. | |
| 5,222,190 A | 6/1993 | Pawate et al. | |
| 5,233,681 A * | 8/1993 | Bahl et al. .................. | 704/252 |
| 5,241,619 A | 8/1993 | Schwartz et al. | |
| 5,388,183 A * | 2/1995 | Lynch .................. | 704/242 |
| 5,416,892 A * | 5/1995 | Loken-Kim .................. | 704/236 |
| 5,477,451 A * | 12/1995 | Brown et al. .................. | 704/9 |
| 5,822,730 A | 10/1998 | Roth et al. | |
| 5,920,837 A | 7/1999 | Gould et al. | |
| 5,991,720 A * | 11/1999 | Galler et al. .................. | 704/251 |
| 6,006,181 A * | 12/1999 | Buhrke et al. .................. | 704/231 |
| 6,073,097 A | 6/2000 | Gould et al. | |
| 6,088,669 A | 7/2000 | Maes | |
| 6,122,613 A * | 9/2000 | Baker .................. | 704/252 |
| 6,253,178 B1 | 6/2001 | Robillard et al. | |
| 6,260,013 B1 | 7/2001 | Sejnoha | |
| 6,275,802 B1 * | 8/2001 | Aelten .................. | 704/255 |
| 6,560,575 B1 * | 5/2003 | Keiller .................. | 704/239 |

OTHER PUBLICATIONS

X. Huang, "Spoken language processing: a guide to theory, algorithm, and system development", 2001, pp. 383–401 and pp. 622–639.

F. Jelinek, "Statistical methods for speech recognition", 1997, chapter 5, pp. 80–103.

* cited by examiner

*Primary Examiner*—Angela Armstrong
(74) *Attorney, Agent, or Firm*—Foley & Lardner LLP

(57) ABSTRACT

A speech recognition method, system and program product, the method in one embodiment comprising: obtaining input speech data; initiating a first speech recognition search process with at least one hypothesis; initiating a second speech recognition search process with a plurality of hypotheses; obtaining partial results from the second speech recognition search process, where the partial results include an evaluation of at least one hypothesis that the first speech recognition search process has not evaluated at this point in time; and utilizing the partial results to alter the first speech recognition search process.

13 Claims, 4 Drawing Sheets

Beam A

Beam B

US 7,031,915 B2

ASSISTED SPEECH RECOGNITION BY DUAL SEARCH ACCELERATION TECHNIQUE

BACKGROUND OF THE INVENTION

Speech recognition systems generally use one of two principal techniques for searching for the best scoring sentence hypothesis, a frame synchronous beam search or a priority queue based search (also called a "stack decoder").

The priority queue search (or stack decoder) uses a priority queue so that the most promising hypotheses can be evaluated first. However, in practice, current recognition systems do not achieve this potential advantage. It has been discovered (X. Huang, A. Acero, H. W. Hon, *Spoken Language Processing*, Prentice Hall, 2001, p. 639) that when the hypotheses on the priority queue are sorted strictly by their match scores, the priority queue search often requires much more computation than the frame-synchronous beam search. This extra computation arises in spite of the fact that the most promising hypotheses are evaluated first. In such a system, it is still necessary to evaluate many alternate hypotheses. A priority queue search with priority based solely on match scores is not as efficient at pruning these alternate hypotheses as a frame-synchronous search, so overall it does more computation. In particular, there is extra computation whenever the previously most promising hypothesis matches poorly on new frames and needs to be replaced by a new hypothesis in the priority queue. Potentially, the computation in this search of the tree of alternate hypotheses can grow exponentially with the length of the sentence.

Therefore, speech recognition systems using a priority queue search generally use a priority queue that ranks shorter hypotheses ahead of longer hypotheses (a hypothesis is considered "shorter" or "longer" based on the estimated ending time of the hypothesis in the speech data), regardless of their actual match scores (such systems are sometimes called "multi-stack decoders," although the multi-stack implementation is mathematically equivalent to a single stack or priority queue in which the priority sort is hierarchical based first on the ending time of the hypothesis and then only comparing scores for hypotheses that end at the same time). This priority scheme makes such a priority queue search comparable in computational efficiency to frame-synchronous beam search, but it also removes most of the potential advantage of priority queue search, because all shorter hypotheses must be evaluated first before the most promising longer hypothesis can be evaluated.

SUMMARY OF THE INVENTION

In one embodiment of the present invention, a speech recognition method is provided, comprising: obtaining input speech data; initiating a first speech recognition search process with at least one hypothesis; initiating a second speech recognition search process with a plurality of hypotheses; obtaining partial results from the second speech recognition search process, where the partial results include an evaluation of at least one hypothesis that the first speech recognition search process has not evaluated at this point in time; and utilizing the partial results to alter the first speech recognition search process.

In one embodiment, the first speech recognition search process is a priority queue process.

In a further embodiment, the first speech recognition search process is a priority queue process using a best first method.

In a further embodiment, the first and second speech recognition search processes are beam search processes.

In a yet further embodiment, the beam search process for the first speech recognition search process has a tighter pruning threshold than the beam search process for the second speech recognition search process.

In a yet further embodiment, the first speech recognition search process proceeds from time frame to time frame at a different rate compared to the second speech recognition search process.

In a further embodiment, a system is provided for speech recognition, comprising: a component for obtaining input speech data; a component for performing a first speech recognition search process with at least one hypothesis; a component for performing a second speech recognition search process with a plurality of hypotheses; a component for obtaining partial results from the second speech recognition search process, where the partial results include an evaluation of at least one hypothesis that the first speech recognition search process has not evaluated at this point in time; and a component for utilizing the partial results to alter the first speech recognition search process.

In a further embodiment, a program product for speech recognition is provided, comprising machine-readable program code for causing, when executed, a machine to perform the following method steps: obtaining input speech data; initiating a first speech recognition search process with at least one hypothesis; initiating a second speech recognition search process with a plurality of hypotheses; obtaining partial results from the second speech recognition search process, where the partial results include an evaluation of at least one hypothesis that the first speech recognition search process has not evaluated at this point in time; and utilizing the partial results to alter the first speech recognition search process.

In a yet further embodiment, a speech recognition method is provided, comprising: obtaining input speech data; initiating a priority queue best first speech recognition search process using a pruning threshold on a best first hypothesis selected from a plurality of hypotheses ranked in an order; initiating a second speech recognition search process substantially simultaneously on a plurality of hypotheses that includes at least one hypothesis that is not evaluated by the first speech recognition search process; obtaining partial results at a point in time from the second speech recognition search process, where the partial results include an evaluation of at least one hypothesis that the priority queue search process has not evaluated at the point in time and a score for that hypothesis; adding a hypothesis to the plurality of hypotheses in the priority queue or reordering the hypotheses in the priority queue based on the partial results; changing the pruning threshold for the priority queue speech recognition process for each point in time that the second process has evaluated; and if a criteria is met, selecting a new best first hypothesis and initiating the new priority queue best first speech recognition search process using the new best first search hypothesis at the point in time where the partial results were taken.

In a yet further embodiment, a speech recognition system is provided, comprising: a component for obtaining input speech data; a component for initiating a priority queue best first speech recognition search process using a pruning threshold on a best first hypothesis selected from a plurality of hypotheses ranked in an order; a component for initiating a second speech recognition search process substantially simultaneously on a plurality of hypotheses that includes at least one hypothesis that is not evaluated by the first speech recognition search process; a component for obtaining partial results at a point in time from the second speech recognition search process, where the partial results include an evaluation of at least one hypothesis that the priority queue search process has not evaluated at the point in time and a score for that hypothesis; a component for adding a hypothesis to the plurality of hypotheses in the priority queue or reordering the hypotheses in the priority queue based on the partial results; a component for changing the pruning threshold for the priority queue speech recognition process for each point in time that the second process has evaluated; and a component for, if a criteria is met, selecting a new best first hypothesis and initiating the new priority queue best first speech recognition search process using the new best first search hypothesis at the point in time where the partial results were taken.

In a yet further embodiment, a program product is provided for speech recognition, comprising machine-readable program code for, when executed, causing a machine to perform the following method steps: obtaining input speech data; initiating a priority queue best first speech recognition search process using a pruning threshold on a best first hypothesis selected from a plurality of hypotheses ranked in an order; initiating a second speech recognition search process substantially simultaneously on a plurality of hypotheses that includes at least one hypothesis that is not evaluated by the first speech recognition search process; obtaining partial results at a point in time from the second speech recognition search process, where the partial results include an evaluation of at least one hypothesis that the priority queue search process has not evaluated at the point in time and a score for that hypothesis; adding a hypothesis to the plurality of hypotheses in the priority queue or reordering the hypotheses in the priority queue based on the partial results; changing the pruning threshold for the priority queue speech recognition process for each point in time that the second process has evaluated; and if a criteria is met, selecting a new best first hypothesis and initiating the new priority queue best first speech recognition search process using the new best first search hypothesis at the point in time where the partial results were taken.

In yet a further embodiment, a speech recognition method is provided, comprising: obtaining input speech data; initiating a first speech recognition search process using a pruning threshold substantially simultaneously on a first plurality of hypothesis; initiating a second speech recognition search process substantially simultaneously on a second plurality of hypotheses wherein a parameter for the process is different from that parameter in the first speech recognition search process; obtaining partial results at a point in time from the second speech recognition search process, where the partial results include an evaluation of at least one hypothesis that the priority queue search process has not evaluated at that point in time and a score for that hypothesis; determining if the score for the at least one hypothesis evaluated by the second speech recognition search process for a particular time frame is better than a best score for that time frame for any hypothesis evaluated by the first speech recognition search process by more than a predetermined amount; and if yes, then restarting the first speech recognition search process at that point in time on a plurality of hypotheses that include the at least one hypothesis that the priority queue search process has not evaluated and using a new pruning threshold.

In yet a further embodiment, a speech recognition system is provided, comprising: a component for obtaining input speech data; a component for initiating a first speech recognition search process using a pruning threshold substantially simultaneously on a first plurality of hypothesis; a component for initiating a second speech recognition search process substantially simultaneously on a second plurality of hypotheses wherein a parameter for the process is different from that parameter in the first speech recognition search process; a component for obtaining partial results at a point in time from the second speech recognition search process, where the partial results include an evaluation of at least one hypothesis that the priority queue search process has not evaluated at that point in time and a score for that hypothesis; a component for determining if the score for the at least one hypothesis evaluated by the second speech recognition search process for a particular time frame is better than a best score for that time frame for any hypothesis evaluated by the first speech recognition search process by more than a predetermined amount; and a component for, if yes, then restarting the first speech recognition search process at that point in time on a plurality of hypotheses that include the at least one hypothesis that the priority queue search process has not evaluated and using a new pruning threshold.

In a further embodiment, a program product is provided for speech recognition, comprising machine-readable program code for causing, when executed, a machine to perform the following method steps: obtaining input speech data; initiating a first speech recognition search process using a pruning threshold substantially simultaneously on a first plurality of hypothesis; initiating a second speech recognition search process substantially simultaneously on a second plurality of hypotheses wherein a parameter for the process is different from that parameter in the first speech recognition search process; obtaining partial results at a point in time from the second speech recognition search process, where the partial results include an evaluation of at least one hypothesis that the priority queue search process has not evaluated at that point in time and a score for that hypothesis; determining if the score for the at least one hypothesis evaluated by the second speech recognition search process for a particular time frame is better than a best score for that time frame for any hypothesis evaluated by the first speech recognition search process by more than a predetermined amount; and if yes, then restarting the first speech recognition search process at that point in time on a plurality of hypotheses that include the at least one hypothesis that the priority queue search process has not evaluated and using a new pruning threshold.

DETAILED DESCRIPTION OF THE PREFERRED EMBODIMENTS

Definitions

Figure 1:
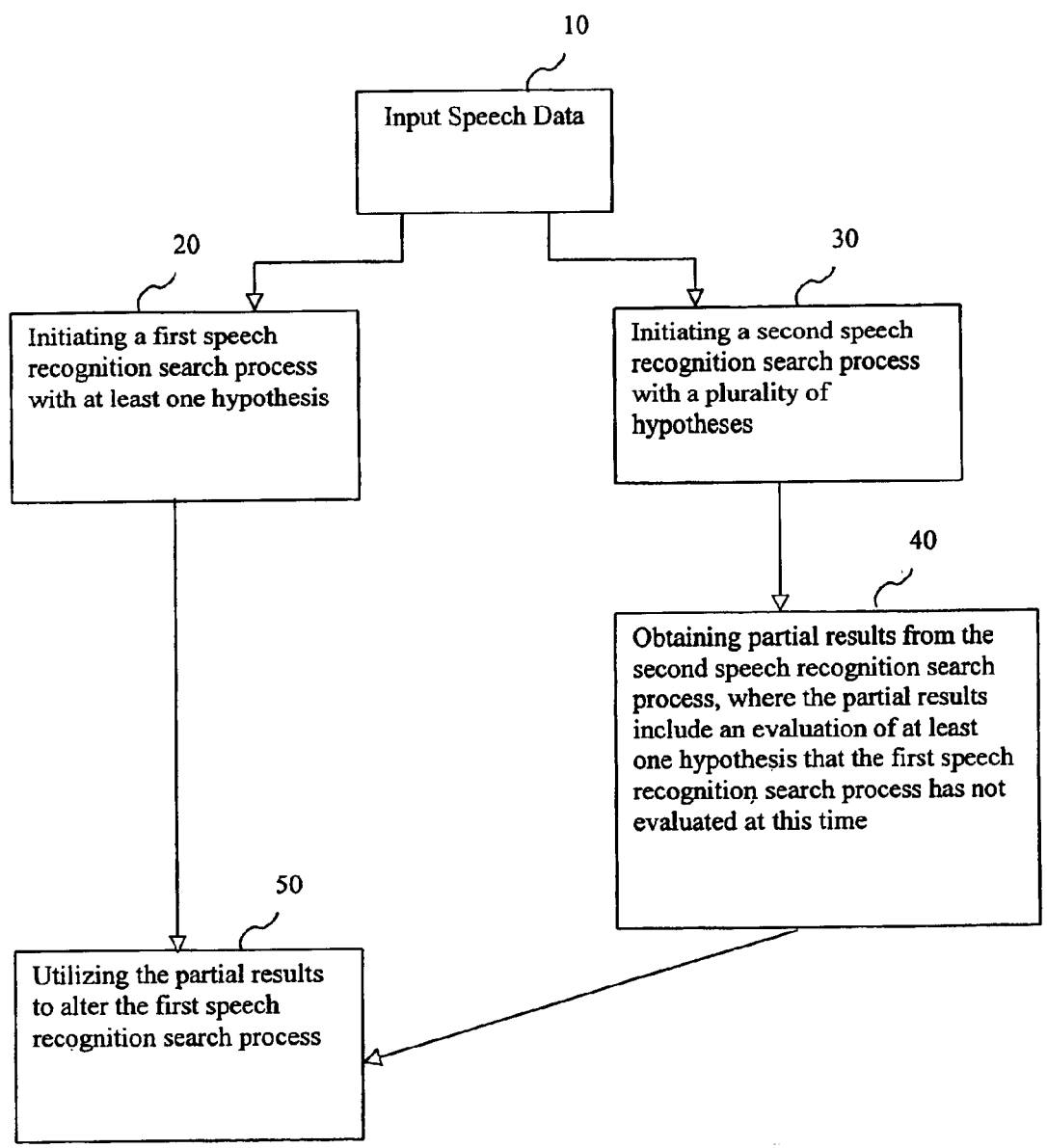
FIG. 1 is a flowchart of an embodiment of the present invention.

The following terms may be used in the description of the invention and include new terms and terms that are given special meanings.

"Linguistic element" is a unit of written or spoken language.

"Speech element" is an interval of speech with an associated name. The name may be the word, syllable or phoneme being spoken during the interval of speech, or may be an abstract symbol such as an automatically generated phonetic symbol that represents the system's labeling of the sound that is heard during the speech interval.

"Priority queue." in a search system is a list (the queue) of hypotheses rank ordered by some criterion (the priority). In a speech recognition search, each hypothesis is a sequence of speech elements or a combination of such sequences for different portions of the total interval of speech being analyzed. The priority criterion may be a score which estimates how well the hypothesis matches a set of observations, or it may be an estimate of the time at which the sequence of speech elements begins or ends, or any other measurable property of each hypothesis that is useful in guiding the search through the space of possible hypotheses. A priority queue may be used by a stack decoder or by a branch-and-bound type search system. A search based on a priority queue typically will choose one or more hypotheses, from among those on the queue, to be extended. Typically each chosen hypothesis will be extended by one speech element. Depending on the priority criterion, a priority queue can implement either a best-first search or a breadth-first search or an intermediate search strategy.

"Best first search" is a search method in which at each step of the search process one or more of the hypotheses from among those with estimated evaluations at or near the best found so far are chosen for further analysis.

"Breadth-first search" is a search method in which at each step of the search process many hypotheses are extended for further evaluation. A strict breadth-first search would always extend all shorter hypotheses before extending any longer hypotheses. In speech recognition whether one hypothesis is "shorter" than another (for determining the order of evaluation in a breadth-first search) is often determined by the estimated ending time of each hypothesis in the acoustic observation sequence. The frame-synchronous beam search is a form of breadth-first search, as is the multi-stack decoder.

"Frame" for purposes of this invention is a fixed or variable unit of time which is the shortest time unit analyzed by a given system or subsystem. A frame may be a fixed unit, such as 10 milliseconds in a system which performs spectral signal processing once every 10 milliseconds, or it may be a data dependent variable unit such as an estimated pitch period or the interval that a phoneme recognizer has associated with a particular recognized phoneme or phonetic segment. Note that, contrary to prior art systems, the use of the word "frame" does not imply that the time unit is a fixed interval or that the same frames are used in all subsystems of a given system.

"Frame synchronous beam search" is a search method which proceeds frame-by-frame. Each active hypothesis is evaluated for a particular frame before proceeding to the next frame. The frames may be processed either forwards in time or backwards. Periodically, usually once per frame, the evaluated hypotheses are compared with some acceptance criterion. Only those hypotheses with evaluations better than some threshold are kept active. The beam consists of the set of active hypotheses.

"Stack decoder" is a search system that uses a priority queue. A stack decoder may be used to implement a best first search. The term stack decoder also refers to a system implemented with multiple priority queues, such as a multi-stack decoder with a separate priority queue for each frame, based on the estimated ending frame of each hypothesis.

Such a multi-stack decoder is equivalent to a stack decoder with a single priority queue in which the priority queue is sorted first by ending time of each hypothesis and then sorted by score only as a tie-breaker for hypotheses that end at the same time. Thus a stack decoder may implement either a best first search or a search that is more nearly breadth first and that is similar to the frame synchronous beam search.

"Branch and bound search" is a class of search algorithms based on the branch and bound algorithm. In the branch and bound algorithm the hypotheses are organized as a tree. For each branch at each branch point, a bound is computed for the best score on the subtree of paths that use that branch. That bound is compared with a best score that has already been found for some path not in the subtree from that branch. If the other path is already better than the bound for the subtree, then the subtree may be dropped from further consideration. A branch and bound algorithm may be used to do an admissible A* search. More generally, a branch and bound type algorithm might use an approximate bound rather than a guaranteed bound, in which case the branch and bound algorithm would not be admissible. In fact for practical reasons, it is usually necessary to use a non-admissible bound just as it is usually necessary to do beam pruning. One implementation of a branch and bound search of the tree of possible sentences uses a priority queue and thus is equivalent to a type of stack decoder, using the bounds as look-ahead scores.

"Admissible A* search." The term A* search is used not just in speech recognition but also to searches in a broader range of tasks in artificial intelligence and computer science. The A* search algorithm is a form of best first search that generally includes a look-ahead term that is either an estimate or a bound on the score portion of the data that has not yet been scored. Thus the A* algorithm is a form of priority queue search. If the look-ahead term is a rigorous bound (making the procedure "admissible"), then once the A* algorithm has found a complete path, it is guaranteed to be the best path. Thus an admissible A* algorithm is an instance of the branch and bound algorithm.

"Score" is a numerical evaluation of how well a given hypothesis matches some set of observations. Depending on the conventions in a particular implementation, better matches might be represented by higher scores (such as with probabilities or logarithms of probabilities) or by lower scores (such as with negative log probabilities or spectral distances). Scores may be either positive or negative. The score may also include a measure of the relative likelihood of the sequence of linguistic elements associated with the given hypothesis, such as the a priori probability of the word sequence in a sentence.

"Dynamic programming match scoring" is a process of computing the degree of match between a network or a sequence of models and a sequence of acoustic observations by using dynamic programming. The dynamic programming match process may also be used to match or time-align two sequences of acoustic observations or to match two models or networks. The dynamic programming computation can be used for example to find the best scoring path through a network or to find the sum of the probabilities of all the paths through the network. The prior usage of the term "dynamic programming" varies. It is sometimes used specifically to mean a "best path match" but its usage for purposes of this patent covers the broader class of related computational methods, including "best path match," "sum of paths" match and approximations thereto. A time alignment of the model to the sequence of acoustic observations is generally available as a side effect of the dynamic programming computation of the match score. Dynamic programming may also be used to compute the degree of match between two models or networks (rather than between a model and a sequence of observations). Given a distance measure that is not based on a set of models, such as spectral distance, dynamic programming may also be used to match and directly time-align two instances of speech elements.

"Best path match" is a process of computing the match between a network and a sequence of acoustic observations in which, at each node at each point in the acoustic sequence, the cumulative score for the node is based on choosing the best path for getting to that node at that point in the acoustic sequence. In some examples, the best path scores are computed by a version of dynamic programming sometimes called the Viterbi algorithm from its use in decoding convolutional codes. It may also be called the Dykstra algorithm or the Bellman algorithm from independent earlier work on the general best scoring path problem.

"Sum of paths match" is a process of computing a match between a network or a sequence of models and a sequence of acoustic observations in which, at each node at each point in the acoustic sequence, the cumulative score for the node is based on adding the probabilities of all the paths that lead to that node at that point in the acoustic sequence. The sum of paths scores in some examples may be computed by a dynamic programming computation that is sometimes called the forward-backward algorithm (actually, only the forward pass is needed for computing the match score) because it is used as the forward pass in training hidden Markov models with the Baum-Welch algorithm.

"Hypothesis" is a hypothetical proposition partially or completely specifying the values for some set of speech elements. Thus, a hypothesis is grouping of speech elements, which may or may not be in sequence. However, in many speech recognition implementations, the hypothesis will be a sequence or a combination of sequences of speech elements. Corresponding to any hypothesis is a set of models, which may, as noted above in some embodiments, be a sequence of models that represent the speech elements. Thus, a match score for any hypothesis against a given set of acoustic observations, in some embodiments, is actually a match score for the concatenation of the set of models for the speech elements in the hypothesis.

"Look-ahead" is the use of information from a new interval of speech that has not yet been explicitly included in the evaluation of a hypothesis. Such information is available during a search process if the search process is delayed relative to the speech signal or in later passes of multi-pass recognition. Look-ahead information can be used, for example, to better estimate how well the continuations of a particular hypothesis are expected to match against the observations in the new interval of speech. Look-ahead information may be used for at least two distinct purposes. One use of look-ahead information is for making a better comparison between hypotheses in deciding whether to prune the poorer scoring hypothesis. For this purpose, the hypotheses being compared might be of the same length and this form of look-ahead information could even be used in a frame-synchronous beam search. A different use of look-ahead information is for making a better comparison between hypotheses in sorting a priority queue. When the two hypotheses are of different length (that is, they have been matched against a different number of acoustic observations), the look-ahead information is also referred to as missing piece evaluation since it estimates the score for the interval of acoustic observations that have not been matched for the shorter hypothesis.

"Missing piece evaluation" is an estimate of the match score that the best continuation of a particular hypothesis is expected to achieve on an interval of acoustic observations that was yet not matched in the interval of acoustic observations that have been matched against the hypothesis itself. For admissible A* algorithms or branch and bound algorithms, a bound on the best possible score on the unmatched interval may be used rather than an estimate of the expected score.

"Sentence" is an interval of speech or a sequence of speech elements that is treated as a complete unit for search or hypothesis evaluation. Generally, the speech will be broken into sentence length units using an acoustic criterion such as an interval of silence. However, a sentence may contain internal intervals of silence and, on the other hand, the speech may be broken into sentence units due to grammatical criteria even when there is no interval of silence. The term sentence is also used to refer to the complete unit for search or hypothesis evaluation in situations in which the speech may not have the grammatical form of a sentence, such as a database entry, or in which a system is analyzing as a complete unit an element, such as a phrase, that is shorter than a conventional sentence.

"Phoneme" is a single unit of sound in spoken language, roughly corresponding to a letter in written language.

"Phonetic label" is the label generated by a speech recognition system indicating the recognition system's choice as to the sound occurring during a particular speech interval. Often the alphabet of potential phonetic labels is chosen to be the same as the alphabet of phonemes, but there is no requirement that they be the same. Some systems may distinguish between phonemes or phonemic labels on the one hand and phones or phonetic labels on the other hand. Strictly speaking, a phoneme is a linguistic abstraction. The sound labels that represent how a word is supposed to be pronounced, such as those taken from a dictionary, are phonemic labels. The sound labels that represent how a particular instance of a word is spoken by a particular speaker are phonetic labels. The two concepts, however, are intermixed and some systems make no distinction between them.

"Spotting" is the process of detecting an instance of a speech element or sequence of speech elements by directly detecting an instance of a good match between the model(s) for the speech element(s) and the acoustic observations in an interval of speech without necessarily first recognizing one or more of the adjacent speech elements.

"Pruning" is the act of making one or more active hypotheses inactive based on the evaluation of the hypotheses. Pruning may be based on either the absolute evaluation of a hypothesis or on the relative evaluation of the hypothesis compared to the evaluation of some other hypothesis.

"Pruning threshold" is a numerical criterion for making decisions of which hypotheses to prune among a specific set of hypotheses.

"Pruning margin" is a numerical difference that may be used to set a pruning threshold. For example, the pruning threshold may be set to prune all hypotheses in a specified set that are evaluated as worse than a particular hypothesis by more than the pruning margin. The best hypothesis in the specified set that has been found so far at a particular stage of the analysis or search may be used as the particular hypothesis on which to base the pruning margin.

"Beam width" is the pruning margin in a beam search system. In a beam search, the beam width or pruning margin often sets the pruning threshold relative to the best scoring active hypothesis as evaluated in the previous frame.

"Best found so far" Pruning and search decisions may be based on the best hypothesis found so far. This phrase refers to the hypothesis that has the best evaluation that has been found so far at a particular point in the recognition process. In a priority queue search, for example, decisions may be made relative to the best hypothesis that has been found so far even though it is possible that a better hypothesis will be found later in the recognition process. For pruning purposes, hypotheses are usually compared with other hypotheses that have been evaluated on the same number of frames or, perhaps, to the previous or following frame. In sorting a priority queue, however, it is often necessary to compare hypotheses that have been evaluated on different numbers of frames. In this case, in deciding which of two hypotheses is better, it is necessary to take account of the difference in frames that have been evaluated, for example by estimating the match evaluation that is expected on the portion that is different or possibly by normalizing for the number of frames that have been evaluated. Thus, in some systems, the interpretation of best found so far may be based on a score that includes a look-ahead score or a missing piece evaluation.

"Modeling" is the process of evaluating how well a given sequence of speech elements match a given set of observations typically by computing how a set of models for the given speech elements might have generated the given observations. In probability modeling, the evaluation of a hypothesis might be computed by estimating the probability of the given sequence of elements generating the given set of observations in a random process specified by the probability values in the models. Other forms of models, such as neural networks may directly compute match scores without explicitly associating the model with a probability interpretation, or they may empirically estimate an a posteriori probability distribution without representing the associated generative stochastic process.

"Training" is the process of estimating the parameters or sufficient statistics of a model from a set of samples in which the identities of the elements are known or are assumed to be known. In supervised training of acoustic models, a transcript of the sequence of speech elements is known, or the speaker has read from a known script. In unsupervised training, there is no known script or transcript other than that available from unverified recognition. In one form of semi-supervised training, a user may not have explicitly verified a transcript but may have done so implicitly by not making any error corrections when an opportunity to do so was provided.

"Acoustic model" is a model for generating a sequence of acoustic observations, given a sequence of speech elements. The acoustic model, for example, may be a model of a hidden stochastic process. The hidden stochastic process would generate a sequence of speech elements and for each speech element would generate a sequence of zero or more acoustic observations. The acoustic observations may be either (continuous) physical measurements derived from the acoustic waveform, such as amplitude as a function of frequency and time, or may be observations of a discrete finite set of labels, such as produced by a vector quantizer as used in speech compression or the output of a phonetic recognizer. The continuous physical measurements would generally be modeled by some form of parametric probability distribution such as a Gaussian distribution or a mixture of Gaussian distributions. Each Gaussian distribution would be characterized by the mean of each observation measurement and the covariance matrix. If the covariance matrix is assumed to be diagonal, then the multi-variant Gaussian distribution would be characterized by the mean and the variance of each of the observation measurements. The observations from a finite set of labels would generally be modeled as a non-parametric discrete probability distribution. However, other forms of acoustic models could be used. For example, match scores could be computed using neural networks, which might or might not be trained to approximate a posteriori probability estimates. Alternately, spectral distance measurements could be used without an underlying probability model, or fuzzy logic could be used rather than probability estimates.

"Language model" is a model for generating a sequence of linguistic elements subject to a grammar or to a statistical model for the probability of a particular linguistic element given the values of zero or more of the linguistic elements of context for the particular speech element.

"General Language Model" may be either a pure statistical language model, that is, a language model that includes no explicit grammar, or a grammar-based language model that includes an explicit grammar and may also have a statistical component.

"Grammar" is a formal specification of which word sequences or sentences are legal (or grammatical) word sequences. There are many ways to implement a grammar specification. One way to specify a grammar is by means of a set of rewrite rules of a form familiar to linguistics and to writers of compilers for computer languages. Another way to specify a grammar is as a state-space or network. For each state in the state-space or node in the network, only certain words or linguistic elements are allowed to be the next linguistic element in the sequence. For each such word or linguistic element, there is a specification (say by a labeled arc in the network) as to what the state of the system will be at the end of that next word (say by following the arc to the node at the end of the arc). A third form of grammar representation is as a database of all legal sentences.

"Stochastic grammar" is a grammar that also includes a model of the probability of each legal sequence of linguistic elements.

"Pure statistical language model" is a statistical language model that has no grammatical component. In a pure statistical language model, generally every possible sequence of linguistic elements will have a non-zero probability.

"Entropy" is an information theoretic measure of the amount of information in a probability distribution or the associated random variables. It is generally given by the formula $$E = \Box_i p_i \log(p_i),$$

where the logarithm is taken base 2 and the entropy is measured in bits.

"Perplexity" is a measure of the degree of branchiness of a grammar or language model, including the effect of non-uniform probability distributions. In some embodiments it is 2 raised to the power of the entropy. It is measured in units of active vocabulary size and in a simple grammar in which every word is legal in all contexts and the words are equally likely, the perplexity will equal the vocabulary size. When the size of the active vocabulary varies, the perplexity is like a geometric mean rather than an arithmetic mean.

"Decision Tree Question" in a decision tree, is a partition of the set of possible input data to be classified. A binary question partitions the input data into a set and its complement. In a binary decision tree, each node is associated with a binary question.

"Classification Task" in a classification system is a partition of a set of target classes.

"Hash function" is a function that maps a set of objects into the range of integers {0, 1, ..., N−1}. A hash function in some embodiments is designed to distribute the objects uniformly and apparently randomly across the designated range of integers. The set of objects is often the set of strings or sequences in a given alphabet.

"Lexical retrieval and prefiltering." Lexical retrieval is a process of computing an estimate of which words, or other speech elements, in a vocabulary or list of such elements are likely to match the observations in a speech interval starting at a particular time. Lexical prefiltering comprises using the estimates from lexical retrieval to select a relatively small subset of the vocabulary as candidates for further analysis. Retrieval and prefiltering may also be applied to a set of sequences of speech elements, such as a set of phrases. Because it may be used as a fast means to evaluate and eliminate most of a large list of words, lexical retrieval and prefiltering is sometimes called "fast match" or "rapid match".

"Pass." A simple speech recognition system performs the search and evaluation process in one pass, usually proceeding generally from left to right, that is, from the beginning of the sentence to the end. A multi-pass recognition system performs multiple passes in which each pass includes a search and evaluation process similar to the complete recognition process of a one-pass recognition system. In a multi-pass recognition system, the second pass may, but is not required to be, performed backwards in time. In a multi-pass system, the results of earlier recognition passes may be used to supply look-ahead information for later passes.

The invention is described below with reference to drawings. These drawings illustrate certain details of specific embodiments that implement the systems and methods and programs of the present invention. However, describing the invention with drawings should not be construed as imposing, on the invention, any limitations that may be present in the drawings. The present invention contemplates methods, systems and program products on any computer readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising computer-readable media for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above are also be included within the scope of computer-readable media. Computer-executable instructions comprise, for example, instructions and data which cause a general purpose computer, special purpose computer, or special purpose processing device to perform a certain function or group of functions.

The invention will be described in the general context of method steps which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The present invention uses two separate search processes, a first speech recognition process that explores fewer hypotheses and is relatively fast for example, and a second speech recognition process that explores more hypotheses such as a frame synchronous beam search for example. An example of the invention would comprise using as the first speech recognition process a priority queue speech recognition search process, and as the second speech recognition process a frame synchronous beam search. In this example using a frame-synchronous beam search process as the second speech recognition process, this process proceeds left-to-right through an utterance (input speech data), computing dynamic programming match scores frame-by-frame. The search is restricted to a "beam" by pruning all hypotheses that match worse than the best scoring hypothesis by more than some specified pruning threshold. Because the computation proceeds frame-by-frame, it is not necessary to compare the scores of hypotheses that have been matched against a different number of frames. On the other hand, since all active (unpruned) hypotheses must be evaluated every frame, no priority is given to the best scoring hypotheses, other than the via the pruning.

Figure 2:
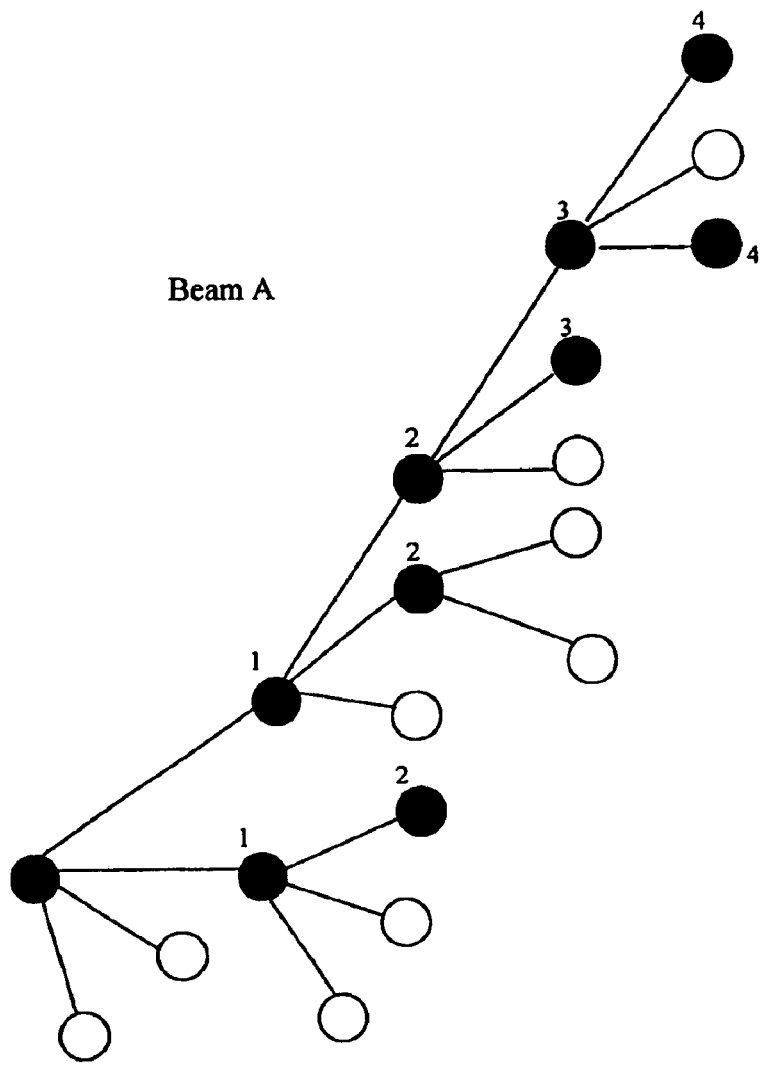
FIG. 2 is a schematic representation of two speech recognition process operation.
Figure 2:
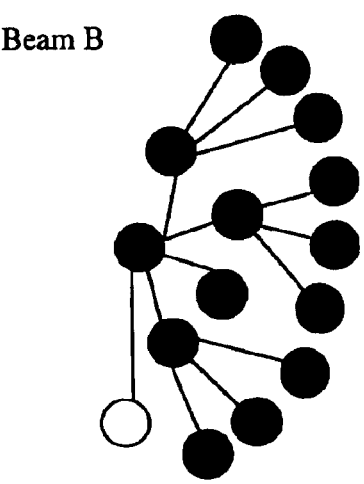

In contrast, for the example using the priority queue speech recognition search process as the first speech recognition search process, this process evaluates only the most promising hypothesis and, in some embodiments, a limited number of alternate hypotheses, and thus proceeds from time frame to time frame at a different rate compared to the second speech recognition process. This compares to the frame synchronous beam search which evaluates a different set of hypotheses including at least one hypothesis that has not yet been evaluated by the first speech recognition process. The concept of these two speech recognition search processes is illustrated by FIG. 2, wherein beam A represents the first speech recognition process as a best first speech recognition search process, with the darkened dots indicating active nodes that were evaluated in a given frame. In essence, Beam A shows an evaluation trail proceeding from a single best first hypothesis, and proceeding from extension to extension based on the best score of that time frame among the competing branches. Beam B represents the second speech recognition search process as a beam search that evaluates multiple hypotheses, with the darkened dots indicating active nodes that were evaluated in a given frame. Time frames 1–4 are shown in FIG. 2 as numerals 1–4, respectively.

Referring now to FIG. 1, there is shown and disclosed a first embodiment of the present invention, comprising a block 10 for obtaining input speech data. In one embodiment, this input speech data may comprise acoustic data.

Referring to block 20, a first speech recognition search process is initiated with at least one hypothesis. A variety of speech recognition processes may be used to implement this block. By way of example, the first speech recognition process could be a priority queue speech recognition process sorted in any desired manner. Alternatively, it could be a priority queue speech recognition process using a best first method. Alternatively, it could be a narrow beam search.

Referring to block 30, a second speech recognition search process is initiated with at least one hypothesis that is not being evaluated by the first speech recognition search process. A variety of speech recognition processes may be used to implement this block. By way of example, a frame synchronous beam search could be utilized that evaluates a larger number of hypotheses than the first speech recognition search process 20. Alternatively, a frame synchronous beam search could be utilized that evaluates a superset of hypotheses relative to the first speech recognition search process. Alternatively or in addition, the beam search for the second speech recognition process 30 could utilize a coarser pruning threshold compared to the first speech recognition process 20.

Referring to block 40, partial results are obtained from the second speech recognition search process 30, where the partial results include an evaluation of at least one hypothesis that the first speech recognition search process has not evaluated at this point in time. In one embodiment, these results may comprise scores for each non-pruned hypothesis, on a frame-by-frame basis, where the score may relate to how closely the acoustic data for that particular frame matches to a phoneme acoustic model. The partial results in some embodiments may also include a pruning threshold generated by any convenient method such as running the recognition process on practice data and setting the threshold such that only a predetermined fraction of the sentences in the practice data have any errors caused by the correct hypothesis being pruned.

Referring to block 50, the partial results of block 40 are utilized to alter the first speech recognition search process. In some embodiments, this alteration of the first speech recognition process may comprise providing information to add a new hypothesis not yet being evaluated by the first speech recognition search process 20. Alternatively or in addition, the alteration of the first speech recognition process 10 may comprise providing a new pruning threshold for each frame. Alternatively or in addition, the alteration of the first speech recognition process 10 may comprise providing information to facilitate a reordering of hypotheses for the first speech recognition search process. Alternatively or in addition, the alteration of the first speech recognition process 10 may comprise providing information to initiate a restart of the first speech recognition search process 20 at an earlier point in time using a different set of hypotheses and/or with different pruning thresholds.

Figure 3:
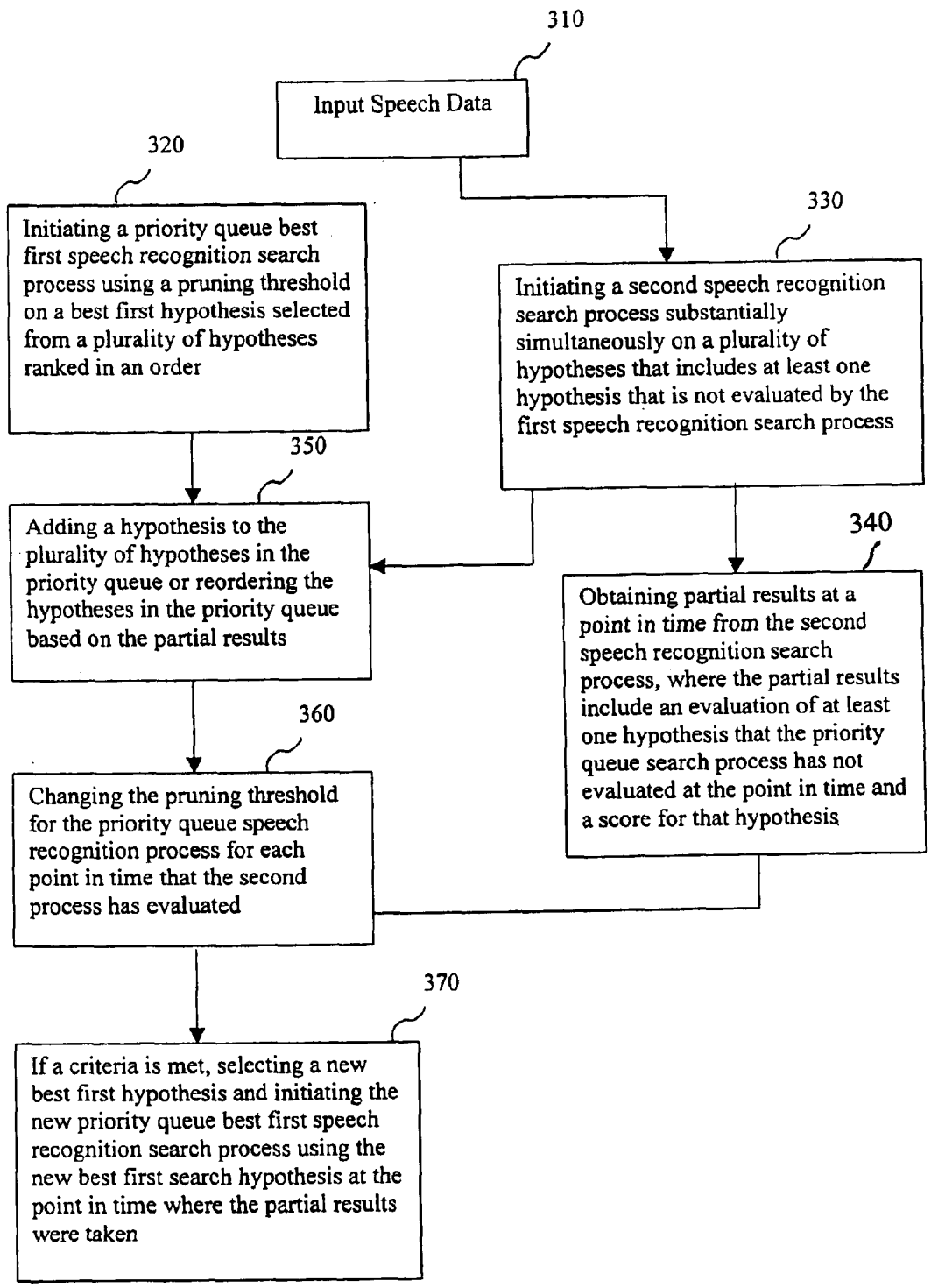
FIG. 3 is a flowchart of a further embodiment of the present invention.

Referring now to FIG. 3, there is shown and disclosed a further embodiment of the present invention, comprising a block 310 for obtaining input speech data. In one embodiment, this input speech data may comprise acoustic data.

Referring to block 320, a priority queue best first speech recognition search process is initiated using a pruning threshold on a best first hypothesis selected from a plurality of hypotheses ranked in an order. By way of example, the pruning threshold will vary from frame to frame based on the scores for the respective branches of the best first hypothesis The pruning threshold may be generated by any convenient method such as setting the threshold at a predetermined margin worse than the best hypothesis that has been found so far for the particular frame. The predetermined pruning margin may depend on whether the best hypothesis represents a state in the middle of a word or represents the end of a word. In a system with a highly structured grammar, it may depend on whether the state is in a part of the grammar with low perplexity or a part with high perplexity. The size of the predetermined pruning margin(s) may be determined by an empirical process such as running recognition on practice data and setting the thresholds such that no more than a specified fraction of the sentences in the practice data have errors caused by pruning.

Referring to block 330, a second speech recognition search process is initiated substantially simultaneously on a plurality of hypotheses that includes a hypothesis that is not being evaluated by the priority queue best first speech recognition search process.

Referring to block 340, partial results are obtained at a point in time from the second speech recognition search process, where the partial results include an evaluation of at least one hypothesis that the priority queue search process has not evaluated at the point in time and a score for that hypothesis. In one embodiment, these results may comprise scores for each non-pruned hypothesis, on a frame-by-frame basis, where the score may relate to how closely the acoustic data for that particular frame matches to a phoneme acoustic model. The partial results in some embodiments may also include a pruning threshold generated by any convenient method such as setting the threshold at a predetermined margin worse than the best hypothesis that has been found so far for the particular frame. The predetermined pruning margin made depend on whether the best hypothesis represents a state in the middle of a word or represents the end of a word. In a system with a highly structured grammar, it may depend on whether the state is in a part of the grammar with low perplexity or a part with high perplexity. The size of the predetermined pruning margin(s) are determined by an empirical process such as running recognition on practice data and setting the thresholds such that no more than a specified fraction of the sentences in the practice data have errors caused by pruning.

Referring to block 350, a hypothesis is added to the plurality of hypotheses in the priority queue or a reordering of the hypotheses in the priority queue is performed. In one embodiment where the partial results include a frame-by-frame score associated with each hypothesis, the addition of the hypothesis or the reordering of the hypotheses in the first speech recognition search process is based on the scores.

Referring to block 360, the pruning threshold for the priority queue speech recognition process is potentially changed for each point in time evaluated by the second speech recognition search process. In one embodiment, the pruning threshold may be changed only if some hypothesis evaluated by the second speech recognition process produces a pruning threshold that is even tighter (prunes more hypotheses as compared to other thresholds) than the old threshold. By way of example, this new frame-by-frame pruning threshold may be utilized if a process is initiated to select a new best first hypothesis.

Referring to block 370, if a criteria is met, a process is initiated to select a new best first hypothesis and then to initiate the new priority queue best first speech recognition search process using the new best first search hypothesis at the point in time where the partial results were taken. In one preferred embodiment, this new best first hypothesis is not initiated by a separate process, but merely as part of the continued operation of the priority queue based search. In this embodiment, the criteria event in block 370 could represent that a new hypothesis that had been added to the queue in block 350 has reached the top of the priority queue. Alternately, the criteria event in block 370 could represent a hypothesis that would anyway have in due course have reached the top of the queue and become the new best first hypothesis. In such an event, the new pruning threshold supplied in block 360 would be used rather than an old pruning threshold for pruning this new best first hypothesis, if block 360 has supplied such new pruning threshold for the time frames that are used to match the new best first hypothesis.

Accordingly, it can be seen that in embodiments using the priority queue search process, the frame-synchronous beam search interacts with the priority queue search process to efficiently prune alternate hypotheses, and in addition, interacts with the priority queue search process by supplying hypotheses to be inserted in the queue. Whenever the previously best matching hypothesis in the priority queue search matches poorly on new frames, alternate hypotheses are available from the beam search. Thus, selected embodiments of the present invention use both a priority queue search and a frame-synchronous beam search, each doing the task that it does best.

Note that in some embodiment, the beam search can be further modified to be more efficient than a stand-alone beam search because it no longer bears prime responsibility for finding the best matching hypothesis. For example, the beam search can use a looser grammatical model which allows the user to speak an utterance that would otherwise be ungrammatical. It also can use filler models to model out-of-vocabulary words. The ability to model out-of-vocabulary words also permits the beam search to model some of the actual vocabulary using the out-of-vocabulary models, resulting in a smaller active vocabulary, using less computation and memory.

StackDecoder

```
Main Priority Queue Search {
// This pseudo-code is written in the form in which higher scores
// are better (like probabilities or logarithms of probabilities). The
// comparisons should be reversed if lower scores are better
// (like distances or negative logarithms of probabilities).
   Put empty string in priority queue
   While (queue not empty and search limit not reached) {
      Sort priority queue by Score(H,T(H)) - Background(T(H))
         // score relative to background when comparing
         // hypotheses with different ending times
      Take top entry H from Queue
      If (Score(H,T(H)) > Prune(T(H))) {
         Fast Lexical Retrieval and Prefiltering of extensions <H,w>
         For all retrieved extensions J = <H,w> {
            Match w in context of H starting at time T(H) -
TimeMargin
            If (J is a complete sentence) {
               Put J in complete sentence list
            } else {
               Put J in Priority Queue
            }
         }
      } else {
         Delete H
      }
   }
   Return list or lattice of complete sentences and scores
}

Match w in context of H starting at time T(H) - TimeMargin {
   BestEnd = - infinity
   Initialize all word.alpha( ,) to - infinity
   For all frame times t from start until exit {
      // "frames" may be either fixed duration frames, or phonetic
segments
      word.alpha(O,t) = Max(word.alpha(O,t), ExitScore(H,t))
      For all nodes s of word w {
         For all arcs a leaving node s {
            word.alpha(d(a),t + 1) = Max(word.alpha(d(a),t + 1),
               word.alpha(s,t) + A(s,a) + B(a,Y(t + 1)))
            // A(s,a) is the score for the event of following arc a
            // from node s, for example, A(s,a) = log(Pr(a | s))
            // B(a,Y(t + 1)) is the match score for the acoustic
            // observations at time t + 1, Y(t + 1) given arc a
            // If the scores are probabilities, multiply
            // rather than add in the line above and similar lines.
            // d(a) is the destination node of arc a
         }
      }
      if (word.alpha(ExitNode(w),t + 1) - Background(t + 1) > BestEnd) {
         BestEnd = word.alpha(ExitNode(w),t) - Background(t + 1)
         T(<H,w>) = t
      }
      word.Best = -infinity
      For all nodes s of word w
         word.Best = Max(word.Best,word.alpha(s,t + 1)
      CurrentBest(t + 1) = Max(CurrentBest(t + 1),word.Best)
      if (word.Best-Background(t + 1) < BestEnd - EndMargin) exit
      // Exit if the best scoring node falls below the best ending score
      // found in some previous frame by more than margin
      Prune(t + 1) = CurrentBest(t + 1) - PruneMargin
      // CurrentBest( ) and Prune( ) are shared with Beam Search
      // EndMargin and PruneMargin are determined empirically on
      // training data
   }
}
BeamSearch to accelerate (assist) Priority Queue Search
```

-continued

```
Beam Search {
  Initialize Galpha( ) and GHistory( )
  Initialize alpha(,) and History(,) for all words w
  For all frame times t {
    CurrentBest(t) = Max(CurrentBest(t),BestScore)
    Prune(t) = CurrentBest(t) - PruneMargin
      // CurrentBest(t) and Prune(t) are shared with Priority
      // Queue decoder
    ProcessActiveLanguageNodes
    For all active word arcs a {
      MatchOneFrameForArc(a)
      Get Best Score B And Exit Score X and ExitHistory from word
arc a
      If (B>Prune) {
        If (X>Prune) {
          If (X>Galpha(d(a),t) {
            Galpha(d(a),t) = X
            GHistory(d(a),t) = <ExitHistory(a),a>
          }
          Activate d(a) for frame t
          If <ExitHistory(a),a> is not in Priority Queue
            Put H = <ExitHistory(a),a> in Priority Queue
        }
      } else {
        Make arc a inactive
      }
    }
  }
}
ProcessActiveLanguageNodes {
  ProcessAllActiveLanguageNodes(g) {
    FastLexicalRetrievalAndPrefilteringOfWordList({w})
    For all retrieved extensions a = <g,w> {
      Put a in active arc list, if not already active
      ST = Galpha(g,t) + A(g,a)
      // entry node of arc a copy of word w is node O
      If (ST > word.alpha(O,t)) {
        word.alpha(O,t) = ST
        word.history(O,t) = <Ghistory(g,t),g,t>
      }
    }
  }
}
OneFrameMatchForWordArc w at time(t) {
  BestScore = -infinity
  For all nodes s of word w {
    For all arcs a leaving node s {
      ST = word.alpha(s,t) + A(s,a) + B(a,Y(t))
      BestScore = Max(BestScore,ST)
      if (ST > word.alpha(d(a),t + 1)) {
        word.alpha(d(a),t + 1) = ST
        word.History(d(a),t + 1) = word.History(s,t)
      }
    }
  }
  ExitScore = word.alpha(ExitNode,t + 1)
  ExitHistory = word.History(ExitNode,t + 1)
}
// This pseudo-code uses object-oriented notation. For example, there
// is a separate copy of the data structures such as word.alpha(,) not
// only for the priority queue search and the beam search, but for each
// instance of the object word in the grammar.
// Background(t + 1) is based on an estimate of the average score per
// frame estimated on training data.
// For convenience, scores may be normalized (not shown).
```

In a further embodiment of the present invention, two frame-synchronous beam searches are used as the first and second speech recognition processes. In a beam search recognition system, a pruning threshold determines the width of the beam and thereby the trade-off between the amount of computation and the error rate. To get a low error rate in high performance recognition systems, the threshold is normally set to do much more computation than is usually needed for most sentences.

In accordance with this embodiment of the invention, one of the beams (a first speech recognition search process) is tuned to a threshold that provides a beam width that requires much less computation than the normal tuning for high performance, but which is adequate for most sentences. The other beam (a second speech recognition search process) is tuned to a high performance threshold. The more computation-intensive beam search lags behind the faster beam search in the acoustic frames that it has matched against its hypotheses. Whenever the high performance beams search finds a hypothesis that matches better than the best hypothesis found by the faster search, the faster search is interrupted and reset starting from back at the acoustic frame at which the higher scoring new hypothesis has been found.

Figure 4:
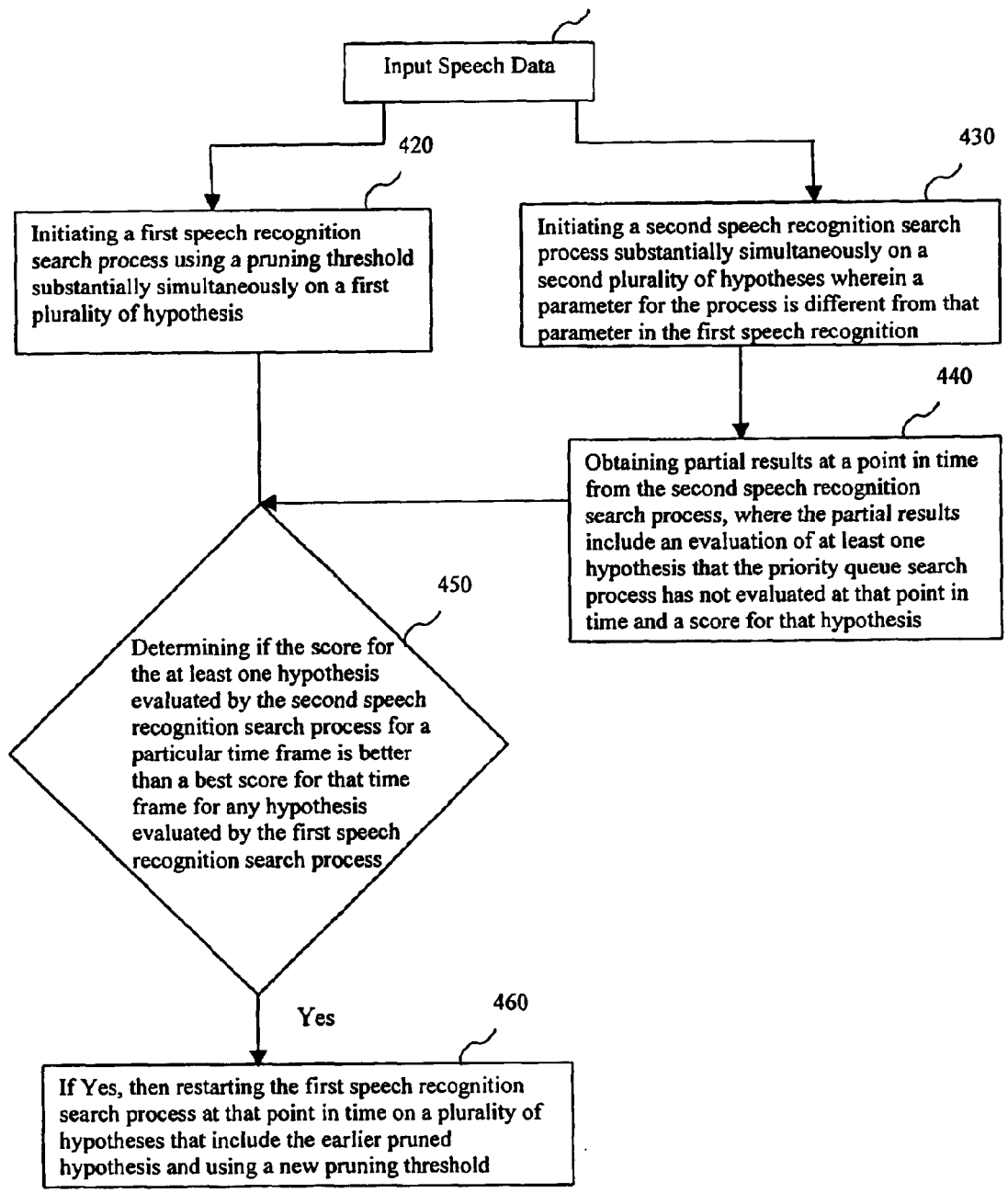
FIG. 4 is a flowchart of a yet further embodiment of the present invention.

Referring now to FIG. 4, a further embodiment of a speech recognition method is disclosed, comprising a block 410 for obtaining input speech data.

Referring to block 420, a first speech recognition search process is initiated using a pruning threshold substantially simultaneously on a first plurality of hypotheses. In one embodiment, the first speech recognition search process uses a tight pruning threshold relative to block 430 discussed below, resulting in a greater pruning, fewer hypotheses, and a faster computation relative to block 430.

Referring to block 430, a second speech recognition search process is initiated substantially simultaneously on a second plurality of hypotheses that includes a hypothesis that has not been evaluated by the first speech recognition search process. In one embodiment of this block, the number of hypotheses being evaluated by the second speech recognition search process is larger than the number of hypotheses being evaluated by the first speech recognition search process. In a further embodiment if this block, the hypotheses being evaluated by the second speech recognition search process is a superset of hypotheses being evaluated by the first speech recognition search process. In a further embodiment of this block, the pruning threshold is set wide relative to the tighter pruning threshold for the first speech recognition search process 420.

Referring to block 440, partial results are obtained at a point in time from the second speech recognition search process, where the partial results include an evaluation of at least one hypothesis that the priority queue search process has not evaluated at that point in time and a score for that hypothesis. In one embodiment, these results may comprise scores for each non-pruned hypothesis, on a frame-by-frame basis, where the score may relate to how closely the acoustic data for that particular frame matches to a phoneme acoustic model. The partial results in some embodiments may also include a pruning threshold generated by any convenient method such as setting the threshold at a predetermined margin worse than the best scoring hypothesis that has been found so far for the particular frame. The predetermined margin may depend on whether the best hypothesis is in a low perplexity or high perplexity state and may be set empirically by running recognition on practice data and setting the threshold(s) such that less than a specified fraction of the sentences in the practice data have errors due to pruning.

Referring to block 450, a determination is made whether the score for the at least one hypothesis evaluated by the second speech recognition search process for a particular time frame is better by more than a predetermined amount than a best score for that time frame for the hypotheses evaluated by the first speech recognition search process. If the score is higher than the best score found by the first beam search, then we know that the score must be the result of a hypothesis that was not evaluated by the first search process.

If the first search process is frame synchronous, then this best scoring hypothesis must be the extension of some hypothesis that was pruned by the first search process in some earlier frame. The extensions of this new best scoring hypothesis will also not be evaluated by the first search process, unless it is restarted at the current frame of the second search process with a new beam that includes the new best hypothesis. However, restarting the first search process, as will be done in block 460 below, is an expensive operation. Furthermore, the second search process will continue to evaluate the extensions of the new best hypothesis even if the restarting event is not triggered. Therefore, the preferred embodiment does not immediately restart the first search process as soon as a new best hypothesis is found, but instead continues evaluating for more frames until the new hypothesis is better than the old hypothesis by more than some predetermined amount. In one embodiment, the predetermined amount may be zero, so that the restart event is triggered immediately. In another embodiment, the predetermined amount may be adjusted to be smaller when the amount of extra computation from restarting the first process at the current frame of the second process is smaller. This situation will happen if the first process is not very far ahead of the second process and will happen automatically when the second search process approaches the end of the sentence. The amount by which the new best hypothesis must be better than the old best hypothesis may be set by trying different values during recognition of practice data and determining an optimum trade-off between the amounts of computation caused by early or delayed restarting of the first search process.

Referring to block 460, if the answer to the determination in block 450 is that a particular hypothesis has been found to have a score that is better than the best score for that time frame for the hypotheses evaluated by the first speech recognition search process 420 by more than a predetermined amount, then restarting the first speech recognition search process at that point in time on a plurality of hypotheses that include the earlier pruned hypothesis and using a new pruning threshold.

Example Pseudo-Code for implementing this embodiment:

BeamSearch1 (Runs with tighter PruneMargin, assisted by broader beam search)

```
Main Search {
  Initialize alpha(,), N(.) and History(,)
  For all frame times t {
    // Restart Beam at an earlier time if BeamSearch2 finds a better
hypothesis
    If there is a message waiting from BeamSearch2 {
      Reinitialize alpha(,), N(.) and History(,) from restart time
      Activate all language nodes and word arcs active in
BeamSearch2
      Reset time to earlier time given by message
      Continue at earlier time
    }
    Prune1 = N1(t) − PruneMargin1
    ProcessActiveLanguageNodes
    For all active word arcs a {
      MatchOneFrameForArc(a)
      Get Best Score B And Exit Score X And ExitHistory from word
arc a
      If (B>Prune1) {
        If (X>Prune1) {
          If (X>Galpha1(d(a),t) {
            Galpha1(d(a),t) = X
            Ghistory1(d(a),t) = <ExitHistory1(a),a>
          }
```

-continued

```
          Activate d(a) for frame t
        }
      } else {
        Make arc a inactive
      }
    }
  }
  Traceback through GHistory1 to retrieve answers
}
ProcessActiveLanguageNodes {
  ProcessAllActiveLanguageNodes(g) {
    FastLexicalRetrievalAndPrefilteringOfWordList({w})
    For all retrieved extensions a = <g,w> {
      Put a in active arc list, if not already active
      ST = Galpha1(g) + A(g,a)
      If (ST > w.alpha(O,t)) {
        w.alpha(O,t) = ST
        w.history(O,t) = <Ghistory1(g,t),g,t>
      }
    }
  }
}
OneFrameMatchForWordArc w at time(t) {
  w.BestScore = −infinity
  For all nodes s of word w {
    For all arcs a leaving node s {
      ST = w.alpha(s,t) + A(s,a) + B(a,Y(t))
      // A(s,a) is the score for the event of following arc a
      // from node s, for example, A(s,a) = log(Pr(a | s))
      // B(a,Y(t + 1)) is the match score for the acoustic
      // observations at time t + 1 , Y(t + 1) given arc a
      // If the scores are probabilities, multiply
      // rather than add in the line above and similar lines.
      // d(a) is the destination node of arc a
      w.BestScore = Max(w.BestScore,ST)
      if (ST > w.alpha(d(a),t + 1)) {
        w.alpha(d(a),t + 1) = ST
        w.History(d(a),t + 1) = w.History(s,t)
      }
    }
  }
  N1(t + 1) = Max(N1(t + 1),w.BestScore)
  ExitScore1 = w.alpha(ExitNode,t + 1)
  ExitHistory1 = w.History(ExitNode,t + 1)
}
BeamSearch2 (broader beam search, assists tighter beam search)
Main Search {
  Initialize alpha(,), N(.) and History(,)
  For all frame times t {
    Prune2 = N2(t) − PruneMargin2
    ProcessActiveLanguageNodes
    For all active word arcs a {
      MatchOneFrameForArc(a)
      Get Best Score B And Exit Score X from word arc a
      If (B>Prune2) {
        If (X>Prune2) {
          If (X>Galpha2(d(a),t)) {
            Galpha2(d(a),t) = X
            GHistory2(d(a),t) = <ExitHistory2(a),a>
          }
          Activate d(a) for frame t
        }
      } else {
        Make arc a inactive
      }
    }
    If (N2(t) > N1(t) + ResetMargin) {
      Send message to BeamSearch1 that better hypothesis has been
found
    }
  }
}
ProcessActiveLanguageNodes {
  ProcessAllActiveLanguageNodes(g) {
    FastLexicalRetrievalAndPrefilteringOfWordList({w})
    For all retrieved extensions a = <g,w> {
      Put a in active arc list, if not already active
      ST = Galpha2(g) + A(g,a)
      If (ST > w.alpha(O,t)) {
```

```
            w.alpha(O,t) = ST
            w.history(O,t) = <Ghistory2(g,t),g,t>
         }
      }
   }
}
OneFrameMatchForWordArc w for time(t) {
   BestScore = -infinity
   For all nodes s of word
      For all arcs a leaving node s
         ST = w.alpha(s,t) + A(s,a) + B(a,Y(t))
         BestScore = Max(BestScore,ST)
         if (ST > w.alpha(d(a),t + 1)) {
            w.alpha(d(a),t + 1) = ST
            w.History(d(a),t + 1) = w.History(s,t)
         }
      }
   }
   N2(t + 1) = Max(N2(t + 1),BestScore)
   ExitScore2 = w.alpha(ExitNode,t + 1)
   Exit History2 = w.History(ExitNode,t + 1)
}
```

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A speech recognition method, comprising:
   obtaining input speech data;
   initiating a first speech recognition search process with at least one hypothesis;
   initiating a second speech recognition search process with a plurality of hypotheses;
   obtaining partial results from the second speech recognition search process, where the partial results include an evaluation of at least one hypothesis that the first speech recognition search process has yet to evaluate at this point in time; and
   utilizing the partial results to alter the first speech recognition search process,
   wherein the first speech recognition search process proceeds from time frame to time frame at a different rate compared to the second speech recognition search process.

2. The method as defined in claim 1, wherein the first speech recognition search process is a priority queue process.

3. The method as defined in claim 1, wherein the first speech recognition search process is a priority queue process using a best first method.

4. The method as defined in claim 1, wherein the first and second speech recognition search processes are beam search processes.

5. The method as defined in claim 4, wherein the beam search process for the first speech recognition search process has a tighter pruning threshold than the beam search process for the second speech recognition search process.

6. A program product for speech recognition, comprising machine-readable program code for causing, when executed, a machine to perform the following method steps:
   obtaining input speech data;
   initiating a first speech recognition search process with at least one hypothesis;
   initiating a second speech recognition search process with a plurality of hypotheses;
   obtaining partial results from the second speech recognition search process, where the partial results include an evaluation of at least one hypothesis that the first speech recognition search process has yet to evaluate at this point in time; and
   utilizing the partial results to alter the first speech recognition search process,
   wherein the first speech recognition search process proceeds from time frame to time frame at a different rate compared to the second speech recognition search process.

7. The program product as defined in claim 6, wherein the first speech recognition search process is a priority queue process.

8. The program product as defined in claim 6, wherein the first speech recognition search process is a priority queue process using a best first method.

9. The program product as defined in claim 6, wherein the first and second speech recognition search processes are beam search processes.

10. The program product as defined in claim 9, wherein the beam search process for the first speech recognition search process has a tighter pruning threshold than the beam search process for the second speech recognition search process.

11. A speech recognition method, comprising:
    obtaining input speech data;
    initiating a first speech recognition search process using a first parameter and a pruning threshold substantially simultaneously on a first plurality of hypotheses;
    initiating a second speech recognition search process substantially simultaneously on a second plurality of hypotheses wherein a second parameter for the second speech recognition search process is different from the first parameter for the first speech recognition search process;
    obtaining partial results at a point in time from the second speech recognition search process, where the partial results include an evaluation of at least one hypothesis that the priority queue search process has yet to evaluate at that point in time and a score for that hypothesis;
    determining if the score for the at least one hypothesis evaluated by the second speech recognition search process for a particular time frame is better than a best score for that time frame for any hypothesis evaluated by the first speech recognition search process by more than a predetermined amount; and if yes, then restarting the first speech recognition search process at that point in time on a plurality of hypotheses that include the at least one hypothesis that the first speech recognition search process has yet to evaluate and using a new pruning threshold, wherein a second parameter is a number of hypotheses being evaluated by the second speech recognition search process, which is larger than the number of hypotheses being evaluated the first speech recognition search process.

12. A speech recognition system, comprising:

a component for obtaining input speech data;

a component for initiating a first speech recognition search process using a first parameter and a pruning threshold substantially simultaneously on a first plurality of hypotheses;

a component for initiating a second speech recognition search process substantially simultaneously on a second plurality of hypotheses wherein a parameter for the second speech recognition search process is different from the first parameter for the first speech recognition search process;

a component for obtaining partial results at a point in time from the second speech recognition search process, where the partial results include an evaluation of at least one hypothesis that the first speech recognition search process has yet to evaluate at that point in time and a score for that hypothesis;

a component for determining if the score for the at least one hypothesis evaluated by the second speech recognition search process for a particular time frame is better than a best score for that time frame for any hypothesis evaluated by the first speech recognition search process by more than a predetermined amount; and a component for, if yes, then restarting the first speech recognition search process at that point in time on a plurality of hypotheses that include the at least one hypothesis that the first speech recognition search process has yet to evaluate and using a new pruning threshold, wherein a second parameter is a number of hypotheses being evaluated by the second speech recognition search process, which is larger than the number of hypotheses being evaluated by the first speech recognition search process.

13. A program product for speech recognition, comprising machine-readable program code for causing, when executed, a machine to perform the following method steps:

obtaining input speech data;

initiating a first speech recognition search process using a first parameter and a pruning threshold substantially simultaneously on a first plurality of hypotheses;

initiating a second speech recognition search process substantially simultaneously on a second plurality of hypotheses wherein a second parameter for the second speech recognition search process is different from the first parameter for the first speech recognition search process;

obtaining partial results at a point in time from the second speech recognition search process, where the partial results include an evaluation of at least one hypothesis that the first speech recognition search process has yet to evaluate at that point in time and a score for that hypothesis;

determining if the score for the at least one hypothesis evaluated by the second speech recognition search process for a particular time frame is better than a best score for that time frame for any hypothesis evaluated by the first speech recognition search process by more than a predetermined amount; and if yes, then restarting the first speech recognition search process at that point in time on a plurality of hypotheses that include the at least one hypothesis that the first speech recognition search process has yet to evaluate and using a new pruning threshold, wherein a second parameter is a number of hypotheses being evaluated by the second speech recognition search process, which is larger than the number of hypotheses being evaluated by the first speech recognition search process.

* * * * *